M. C. BROWN.
Oil-Car.

No. 216,506.  Patented June 17, 1879.

WITNESSES
E. J. Nottingham
A. W. Bright

INVENTOR
M. C. Brown
By Leggett & Leggett
ATTORNEYS.

UNITED STATES PATENT OFFICE.

M. CAMPBELL BROWN, OF CLEVELAND, OHIO.

IMPROVEMENT IN OIL-CARS.

Specification forming part of Letters Patent No. 216,506, dated June 17, 1879; application filed January 7, 1879.

*To all whom it may concern:*

Be it known that I, M. CAMPBELL BROWN, of Cleveland, in the county of Cuyahoga and State of Ohio, have invented certain new and useful Improvements in Oil-Cars; and I do hereby declare the following to be a full, clear, and exact description of the invention, such as will enable others skilled in the art to which it pertains to make and use it, reference being had to the accompanying drawings, which form part of this specification.

My invention relates to cars, and especially to that class of cars designed for transporting merchandise and oil or other liquids; and it consists in the parts and combination of parts hereinafter described and claimed, whereby oils or other liquids may be safely transported in the same car with miscellaneous merchandise.

Figure 1:
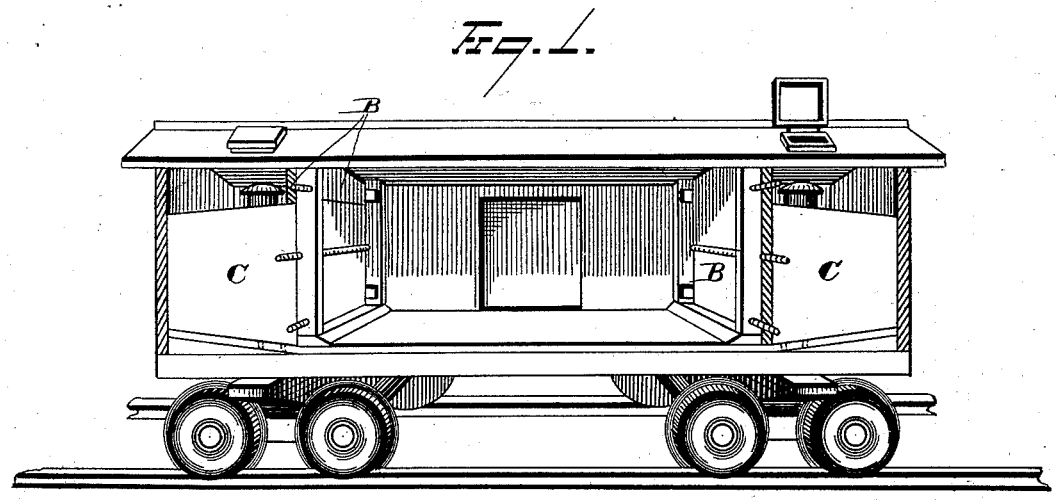
Figure 2:
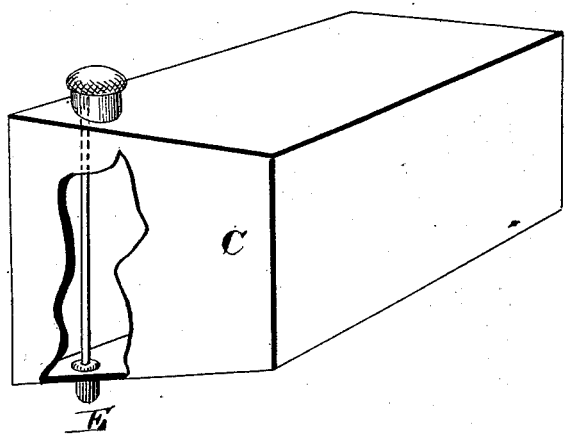

In the drawings, Figure 1 represents in side elevation, and with one side removed to show the internal arrangement and construction, a car according to my invention; and Fig. 2 is a detached view representing partly in section a tank or container for carrying oil or other fluids.

The object, as briefly above stated, of my device is to produce an improved form of car for the transportation of oils and liquids in bulk, and which shall also be adapted for the transportation of ordinary merchandise on roads where a load of oil or liquid cannot be obtained on return trip, thus obviating the necessity of hauling empty tank-cars over long distances, as is now commonly done; and to this end the construction of the ordinary freight-car is modified as follows: The car-space is divided into two or more compartments; but, for the purpose of the present specification, we will suppose it to be divided into three. The central compartment, as shown in the drawings, would embrace about two-thirds of the entire length of the car, and is designed and adapted for ordinary storage, and for this purpose may be constructed in any proper manner. The two end compartments occupy each about one-sixth of the entire length of the car, are located in the ends thereof, over the trucks, and are designed and constructed to contain metallic tanks, substantially such as shown in Fig. 2, which tanks are adapted for safely containing and transporting oil or other liquid.

I prefer to provide partitions B to extend from the roof to the floor either of the car or tank, and these partitions I make readily adjustable in order that by their removal a ready inspection of the metal tanks may be had, also permitting, in case of necessity, the removal of said tanks, which are to be made small enough to pass through the door of the car.

The floor of the central compartment is made level throughout its entire extent; but in the end compartments, commencing at the point where the partitions B and the floor meet, it is gradually elevated toward each end of the car, thus affording a reliable drainage, which would secure the contents of the central compartment against damage should either tank leak.

In this connection I would suggest that the floor of the car beneath the tanks be sufficiently perforated to permit the escape of leaking fluid.

I also construct the tanks in such a manner as to secure a ready and perfect drainage of their contents in discharging. Their bottoms are inclined to fit on the bottoms of their respective compartments in the car, and from the lowest point of each of the same the discharge-pipe E leads.

The discharge-pipe E should be supplied with any suitable stop-cock arrangement or its equivalent.

In order to fill the tanks I make an opening through their top, which opening shall register with the door in the roof of the car, through which the tanks may be filled.

Not only should the floor of the car beneath that portion where the tanks are placed be formed on a slant corresponding with the slanting bottom of said tanks, but I also make the top of each tank inclined, and form their filling point at the highest part of the tank, so as to permit a free escape of air while filling.

The reservoirs or tanks referred to should be firmly secured in any manner to their place in the car against displacement during transit, and this may be done by stay-rods or anything of the kind.

I am aware that the several features embodied in my improvement are not independently new, and I restrict the invention to the specific combination of parts set forth in the claim.

What I claim is—

A car subdivided into two or more compartments, each end compartment containing an oil-tank, said tank constructed with an inclined or self-draining bottom, and resting upon a floor formed in counterpart thereto, said tank also having a tapering or inclined top with a filling-opening placed at or near its highest point and in line with a filling-opening in the car-top, and there being a removable partition separating said tank from the next adjacent compartment, all combined substantially as set forth.

In testimony whereof I have signed my name to this specification in the presence of two subscribing witnesses.

M. CAMPBELL BROWN.

Witnesses:
 JNO. CROWELL, Jr.,
 W. E. DONNELLY.